United States Patent
Taudt et al.

(10) Patent No.: US 9,879,835 B2
(45) Date of Patent: Jan. 30, 2018

(54) LIGHTING UNIT FOR A HEADLIGHT

(71) Applicant: ZIZALA LICHTSYSTEME GMBH, Wieselburg (AT)

(72) Inventors: Lukas Taudt, Wieselburg (AT); Gerald Bohm, Ybbs (AT); Josef Plank, Purgstall/Erlauf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 0 days.

(21) Appl. No.: 14/422,755

(22) PCT Filed: Aug. 29, 2013

(86) PCT No.: PCT/AT2013/050168
§ 371 (c)(1),
(2) Date: Feb. 20, 2015

(87) PCT Pub. No.: WO2014/032071
PCT Pub. Date: Mar. 6, 2014

(65) Prior Publication Data
US 2015/0226395 A1 Aug. 13, 2015

(30) Foreign Application Priority Data
Sep. 3, 2012 (AT) .............................. A 50354/2012

(51) Int. Cl.
*F21S 8/10* (2006.01)
*F21V 8/00* (2006.01)

(52) U.S. Cl.
CPC ....... *F21S 48/1241* (2013.01); *F21S 48/1154* (2013.01); *F21S 48/125* (2013.01);
(Continued)

(58) Field of Classification Search
CPC ............... F21S 48/1241; F21S 48/2225; F21S 48/1154; F21S 48/2231; F21S 48/2275; G02B 6/0075; G02B 6/0043
See application file for complete search history.

(56) References Cited

U.S. PATENT DOCUMENTS 5,184,883 A * 2/1993 Finch ................... B60Q 1/0011
362/321
5,931,576 A 8/1999 Kreysar et al.
(Continued)

FOREIGN PATENT DOCUMENTS

DE 102008013603 A1 9/2009
EP 2103867 A2 9/2009
(Continued)

OTHER PUBLICATIONS

First Office Action of the Austrian priority application No. A 50354/2012.dated Jul. 4, 2013.
(Continued)

*Primary Examiner* — Julie Bannan
(74) *Attorney, Agent, or Firm* — Eversheds Sutherland (US) LLP

(57) ABSTRACT

A lighting unit for a headlight, in particular a motor vehicle headlight, consisting of a plurality of light sources (1), a light guide unit (2) having a plurality of light guides (3), and a downstream projection lens having a focal plane (E), wherein each light guide (3) has a light decoupling face (4), wherein
a.) the light decoupling faces (4) of at least two adjacent light guides (3) are offset in relation to one another with respect to the focal plane (E), and/or
b.) at least two light guides (3) adjacent to one another in each case contact one another in a contact area (12) along an extension (b and b'), wherein the respective extensions
(Continued)

Figure 9:
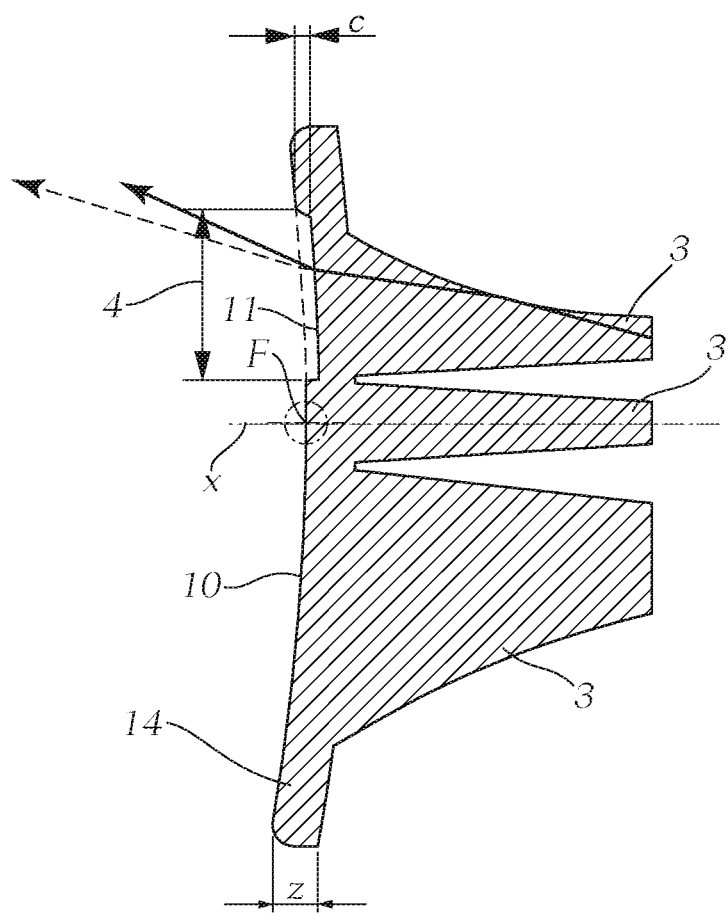

(b and b'), measured with respect to the focal plane (E) of the lens, deviate from one another.

12 Claims, 4 Drawing Sheets

(52) U.S. Cl.
CPC ........ *F21S 48/1747* (2013.01); *G02B 6/0043* (2013.01); *G02B 6/0075* (2013.01)

(56) References Cited

U.S. PATENT DOCUMENTS

| | | | |
|---|---|---|---|
| 2005/0111235 A1* | 5/2005 | Suzuki | B60Q 1/2696 362/555 |
| 2006/0203486 A1* | 9/2006 | Lee | G02B 6/0018 362/244 |
| 2006/0221310 A1* | 10/2006 | Kim | F21K 9/00 353/99 |
| 2008/0253144 A1 | 10/2008 | Dolson et al. | |
| 2010/0246200 A1* | 9/2010 | Tessnow | F21S 48/2237 362/509 |

FOREIGN PATENT DOCUMENTS

| | | |
|---|---|---|
| EP | 2280215 A2 | 2/2011 |
| JP | 2011249183 A | 12/2011 |
| WO | 2008101330 A1 | 8/2008 |
| WO | 2011121488 A1 | 10/2011 |
| WO | 2014012128 A1 | 1/2014 |
| WO | 2014094017 A1 | 6/2014 |

OTHER PUBLICATIONS

International Search Report and Written Opinion for PCT International Application No. PCT/AT2013/050168 dated Feb. 11, 2014.

* cited by examiner

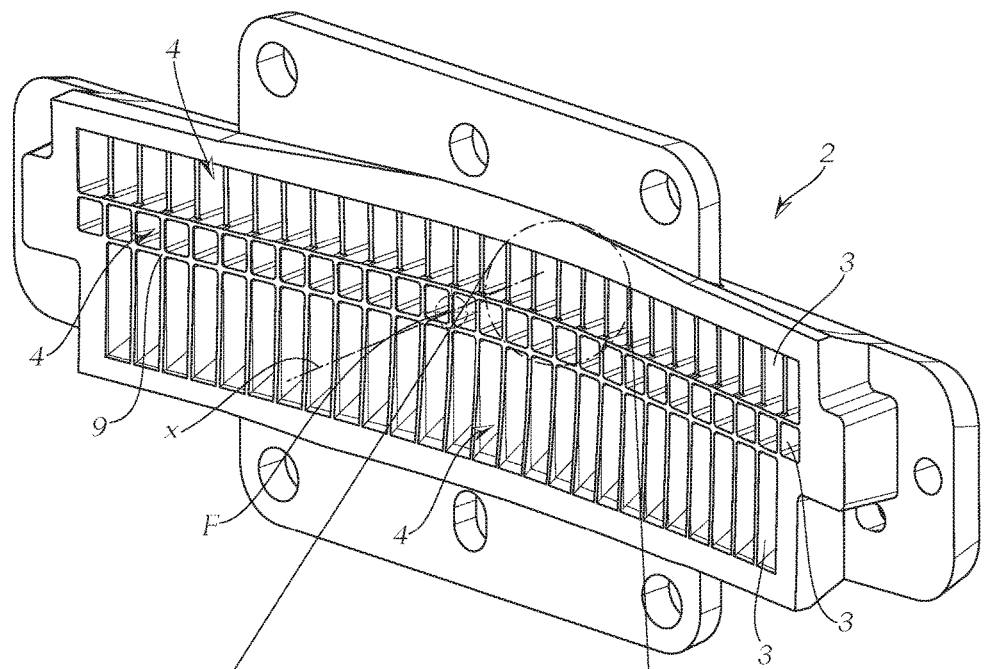
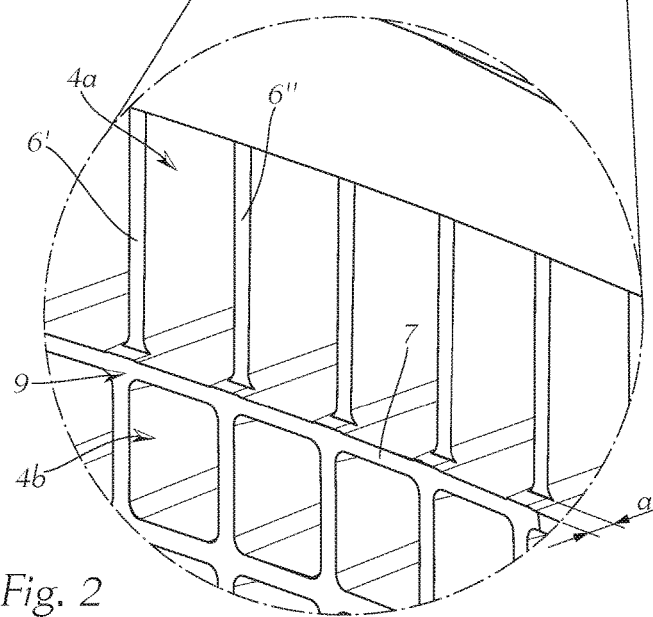
Fig. 1
Fig. 2

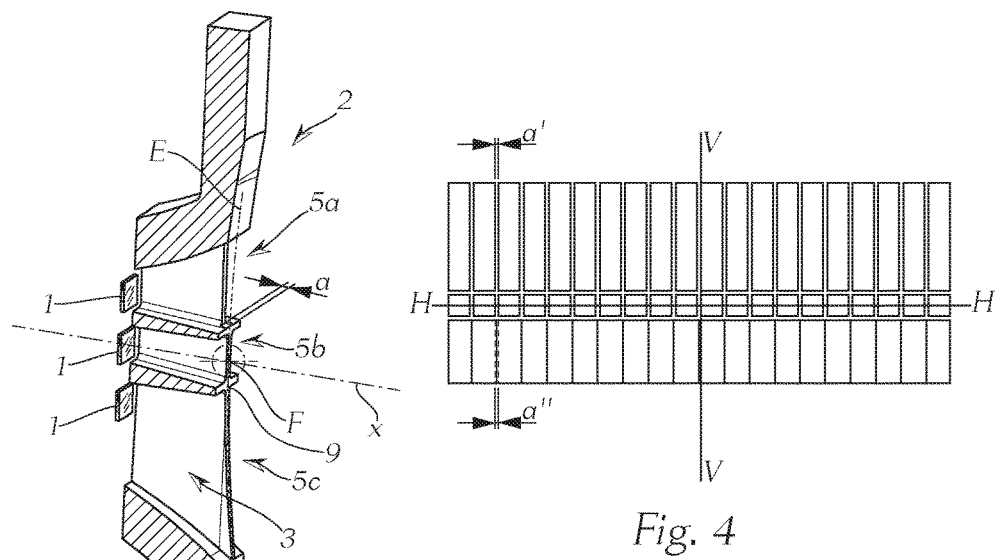
Fig. 3
Fig. 4
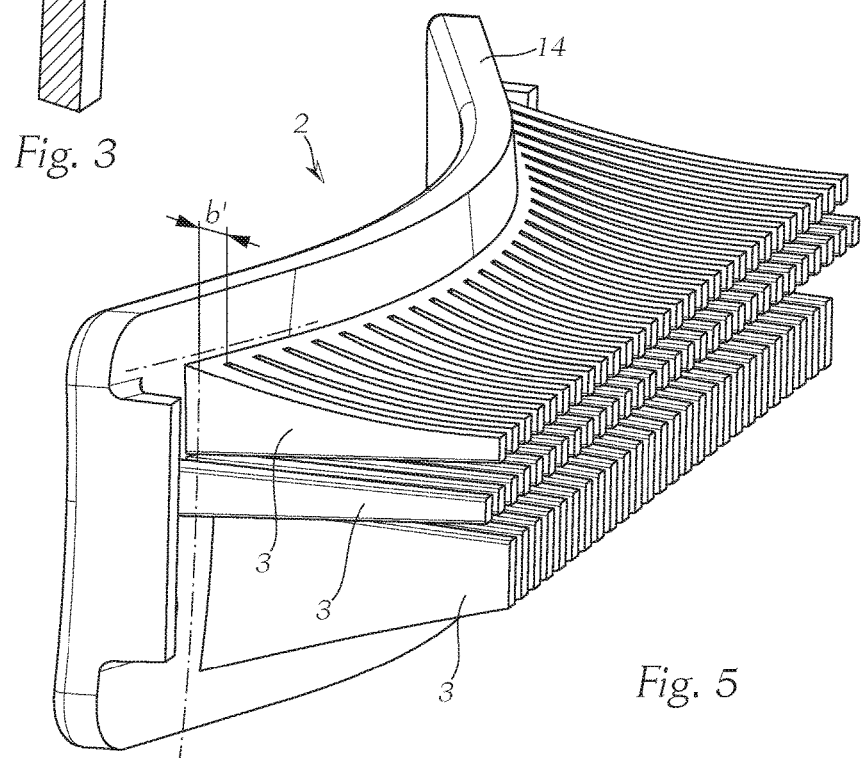
Fig. 5

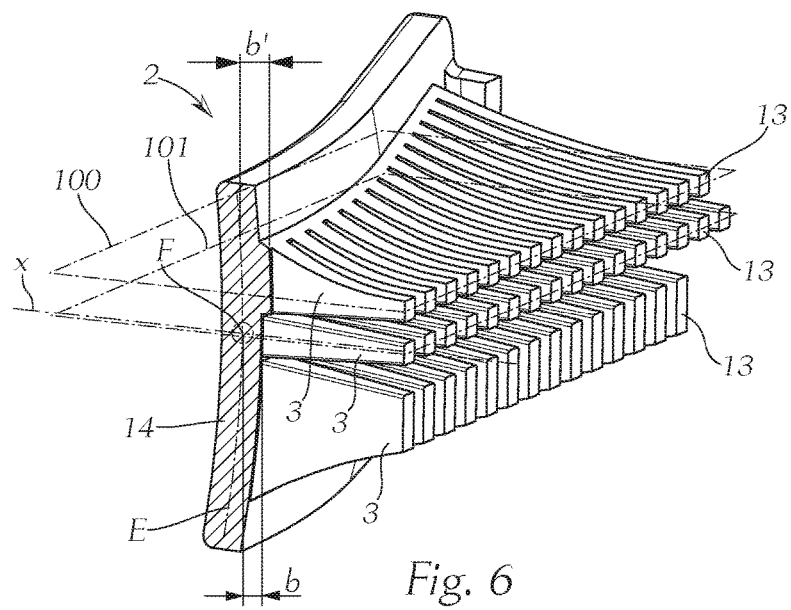
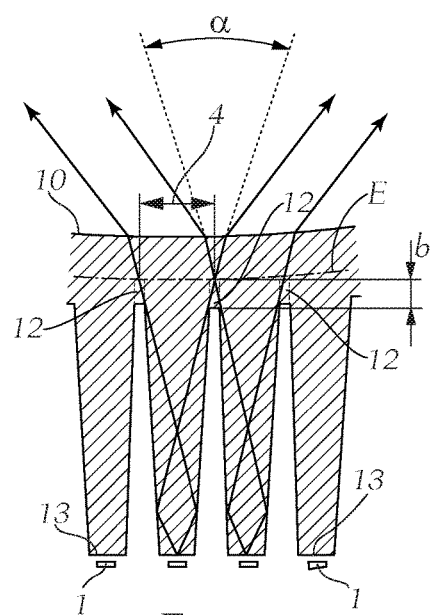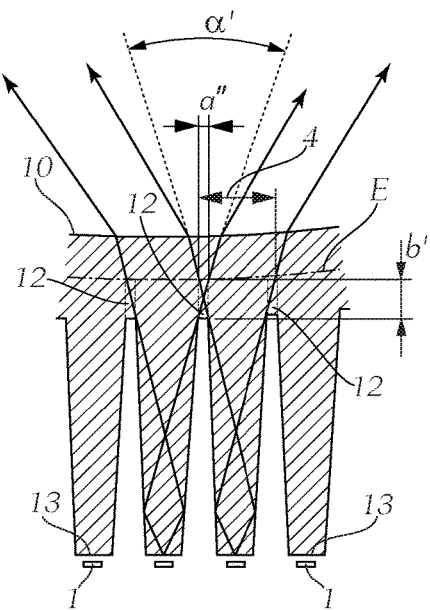

LIGHTING UNIT FOR A HEADLIGHT

The invention relates to a lighting unit for a headlight, in particular a motor vehicle headlight, consisting of a plurality of light sources, a light guide unit having a plurality of light guides, and a downstream projection lens having a focal plane, wherein each light source has a light decoupling face.

Lighting units of this type are conventional in vehicle construction and are used for example for the projection of glare-free main beam light in that the light is generally emitted from a plurality of artificial light sources and is bundled in the irradiation direction by a corresponding plurality of adjacently arranged light guides. The light guides have a relatively small cross section and therefore emit the light of the individual light sources associated with each light guide in the irradiation direction in a very concentrated manner. In this regard, AT 510 437 A4 discloses a light module that has a light guide in the form of an optical waveguide referred to there as a light tunnel, and also a plurality of light sources.

On the one hand the concentrated irradiation of the light guides is desirable, for example in order to comply with legal guidelines with regard to the light/dark line of the dipped beam of a motor vehicle headlight, and on the other hand interfering inhomogeneities are thus created in areas of the light exposure in which a uniform illumination is desirable, for example in front of a motor vehicle headlight, as a result of which measures have been taken in order to reduce these inhomogeneities.

The light sources and also the light guides generally therefore can be arranged as close to one another as possible in order to thus minimise the less intensively illuminated portions in the light exposure. However, the light sources and also the light guides cannot be arranged arbitrarily close to one another due to technical reasons, and therefore further measures are necessary in order to increase the homogeneity of the light distribution.

Known methods here provide a "growing together" of the light exposure. By way of example, an optical lens for defocusing the concentrated irradiation is used, with which the entire light guide unit is moved out of the focal plane of the optical lens. Optical lenses are also known that have special structures in the μm range by means of which a light scattering can be achieved, wherein the disadvantageous colour distortion occurring with conventional optical lenses is prevented.

The two specified measures, specifically those for defocusing and also for light scattering, share the common feature that they act on the entire light exposure of the headlight. The advantageous effect of a more homogenous light distribution is therefore contrasted by a more blurred projection of all light guides, whereby for example guidelines with regard to the light/dark line of the dipped beam of a motor vehicle headlight cannot be observed, or disadvantageous compromises have to be made between homogenised or scattered and focused irradiation.

The object of the invention is therefore to create a lighting unit for headlights that on the one hand enables locally a homogenous light distribution, for example to the front, and at the same time also allows a concentrated irradiation of the light guides in those areas in which this is desirable and/or necessary.

The object is achieved in that a.) the light decoupling faces of at least two adjacent light guides are offset in relation to one another with respect to the focal plane of the lens, and/or b.) at least two light guides adjacent to one another in each case contact one another in a contact area along an extension, wherein the respective extensions, measured with respect to the focal plane of the lens, deviate from one another.

This enables an efficient, economical and robust, more blurred local projection of individual light decoupling faces or light guides associated therewith, whereby a homogenous light exposure (homogenisation) can be provided in a simple manner in the desired areas. By way of example, such areas are located in a horizontal portion of an area in front of a headlight, whereas an illumination of a main beam area is to be concentrated to the greatest possible extent and directed, for example in order to selectively mask out vehicles travelling in the opposite direction.

In a particularly simple embodiment of the invention the light decoupling faces of at least two light guides arranged one above the other at least in portions are offset in relation to one another with respect to the focal plane.

In order to obtain a light exposure that is as extensive as possible and also homogenous, the light guides in an advantageous embodiment are arranged in at least two rows arranged one above the other. Here, the light guides should be guided as close to one another as possible, whereby inhomogeneities in the light exposure are reduced.

In order to additionally reduce local inhomogeneities in the light exposure, all light decoupling faces in a row are offset in relation to the light decoupling faces of a row arranged below with respect to the focal plane in an expedient variant. Since the light decoupling faces are arranged upstream of a projection lens that inverts the incoming beam path, an offset of the upper row leads to a homogenisation of the irradiation of a "lower" portion of the light exposure, that is to say usually of an area in front of a headlight. By way of example, this enables a more homogenous illumination of the area in front of a headlight. All position references here, unless specified otherwise, relate to the headlight and components thereof in the installed state, in particular to the state installed in a vehicle, located in the horizontal position.

According to experience the structure of the headlight according to the invention is particularly efficient when the light guides are arranged in exactly three rows arranged one above the other. With such an arrangement the upper row for example can illuminate the area in front of the headlight, the middle row can be used to illuminate in the area of the light/dark line (or the light/dark boundary), and the purpose of the lower row can be to illuminate the main beam area of the headlight.

In order to achieve a defined local homogenisation in the light exposure of the area in front of the headlight according to the invention, the light decoupling faces of the uppermost row of light guides are offset by a fixed distance with respect to the focal plane against a primary irradiation direction in accordance with a development of the invention. Alternatively, the upper two rows may also be jointly offset, for example when the upper two rows are involved in the illumination of the area to the front. Generally, any variant in which a homogenisation of the light exposure is desirable can be selected. Thus, any row or predefined number of light decoupling faces that is/are involved in the creation of the main beam could also be offset. The primary irradiation direction is the direction in which the luminous intensity of the irradiation of the respective light decoupling face usually reaches a maximum. This is generally located normal to the focal plane of the downstream projection lens.

In order to ensure an efficient and simple irradiation of the light guides, each light decoupling face in an advantageous embodiment is formed by a planar irradiation-side end region of the associated light guide, said end region being formed by the irradiation-side end of a wall delimiting the light guide. Here, the light guides are reflectors which are hollow and of which the reflector faces are coated reflectively, in particular are coated with aluminium.

Here, in detail, each wall may consist of two substantially vertical wall portions and two substantially horizontal wall portions that in cross section form a rectangle, whereby a particularly economical and effective structure of the light guides is provided.

In accordance with a development of the invention light guides arranged one above the other are adjacent to one another and have a common horizontal wall portion, whereby a particularly compact structure of the light guide unit is enabled.

In order to provide a local horizontal homogenisation in a particularly simple manner, the vertical wall portions of at least one light guide in an advantageous variant are offset in a stepped manner by a length a with respect to at least one horizontal wall portion of the at least one light guide.

In order to achieve a constant local homogenisation, the vertical wall portions of at least one light guide can be offset in a stepped manner by a length a with respect to precisely one horizontal wall portion of precisely one light guide in accordance with a development of the invention.

A value of the length a for example of just 0.5 mm can enable sufficient homogeneity. Here, an overlap of the projection of the individual light decoupling faces occurs already. If the homogeneity is to be increased further, the length a is to be increased. The increase of the length a can be implemented for example in individual steps with an increment of $1/10$ mm. If the homogeneity is to be reduced, the length a can be reduced in a similar manner. The exact value of the length a is fixed in a manner dependent on the homogeneity to be achieved and also on the entire optical system associated therewith (light source, light guide, light decoupling face, projection lens). In accordance with an alternative according to the invention the light guides are formed as optical waveguides. In the sense of the present invention an optical waveguide is to be understood to mean a structure in which incoming light is reflected along the extension of the optical waveguide by total reflection at the walls, wherein the optical waveguide is formed as a solid body. In this regard it is preferable for the optical waveguides to be manufactured from a transparent plastic. Alternatively, these can be produced from glass or also from any other material, for example silicone, that is suitable for guiding light. In this regard it is advantageous if the light decoupling faces are part of at least one light decoupling plane, wherein individual light decoupling faces are adjacent to one another. A particularly simple technical structure of a lighting unit according to the invention can thus be provided that can be produced economically.

In accordance with a development of the alternative variant of the invention the light decoupling faces are part of a first and at least one second light decoupling plane, wherein individual light decoupling faces are adjacent to one another, wherein the first and the second light decoupling plane are offset in relation to one another with respect to the focal plane.

Here, it is particularly advantageous if the first light decoupling plane and precisely one second light decoupling plane are offset in relation to one another with respect to the focal plane since the second light decoupling plane is offset by the length c with respect to the focal plane against a primary irradiation direction.

A value of the length c for example of 0.5 mm already can enable sufficient homogeneity. Here, an overlap of the projection of the individual light decoupling faces occurs already. If the homogeneity is to be increased further, the length c is to be increased. The increase of the length c can be implemented for example in individual steps with an increment of $1/10$ mm. If the homogeneity is to be reduced, the length c can be reduced in a similar manner. The exact value of the length c is fixed in a manner dependent on the homogeneity to be achieved and also on the entire optical system associated therewith. A further possibility of local (preferably horizontal) homogenisation is given by the above-specified features b.), as defined in Claim 1. The exact values of the lengths b and b' are fixed here in a manner dependent on the homogeneity be achieved and also on the entire optical system associated therewith.

In addition a light-scattering optics can be provided directly on the light decoupling faces of individual optical waveguides, whereby an additional possibility for local homogenisation is given. The term "directly" is understood in this context to mean an arrangement in which the light-scattering optics either directly contacts the light decoupling faces or is slightly distanced therefrom (for example for assembly reasons). Here, it is essential that the light-scattering optics can act exclusively on the individual light decoupling face on which the light-scattering optics is provided. The light-scattering optics may be formed by any optical elements known to a person skilled in the art that enable a blurred projection of incoming light beams. Cylinder lenses are preferably used for this purpose since these enable a horizontal scattering of the incoming light beams. Alternatively, additional optics that are arranged between the projection lens and the decoupling face 4 of the respective reflector and cause a corresponding additional scattering of the light beams can also be provided with the light guides formed as reflectors.

The invention inclusive of further advantages will be explained in greater detail hereinafter with reference to a number of exemplary, non-limiting embodiments that are illustrated in the drawings, in which FIG. 1 shows a perspective illustration of a first embodiment of a light guide unit according to the invention, FIG. 2 shows a perspective detailed illustration of FIG. 1, FIG. 3 shows a perspective vertical sectional illustration of the light guide unit illustrated in FIG. 1, FIG. 4 shows the light exposure of a light guide unit according to the invention, FIG. 5 shows a perspective illustration of a second embodiment of a light guide unit according to the invention obliquely from behind, FIG. 6 shows a perspective vertical sectional illustration of the light guide unit illustrated in FIG. 5, FIG. 7 shows a beam path of light beams in a horizontal, planar sectional illustration along the plane of section 101 of FIG. 6, FIG. 8 shows a beam path of light beams in a horizontal, planar sectional illustration along the plane of section 100 of FIG. 6, and FIG. 9 shows a vertical sectional illustration of a third embodiment of a light guide unit according to the invention.

FIG. 1 illustrates a first embodiment of a lighting unit comprising a light guide unit 2 according to the invention, in which light guides 3 are arranged adjacently. The light guides 3 are formed in this case as reflectors and have light decoupling faces 4, which are designed to irradiate the light in the direction of a downstream projection lens (not illustrated). Here, the light guides 3 are oriented substantially in the direction of an axis x associated with the projection lens, wherein the light decoupling faces 4 (with the exception of the light decoupling faces 4 that form an upper row) are located in the focal plane E (illustrated in FIG. 3) of the projection lens. Accordingly, the focal point F associated with the projection lens is located directly on a light decoupling face 4. The focal plane E is in this case slightly curved both in the vertical and horizontal direction in accordance with a field of view curvature. The light guides 3 are in this case arranged in three rows stacked one above the other in a centred manner, wherein the light decoupling faces 4 thereof are separated from one another by a wall 9 delimiting the light guides 3.

FIG. 2 shows FIG. 1 in detail. Two exemplary light decoupling faces 4a and 4b are denoted, wherein the light decoupling face 4a is delimited from the surrounding light decoupling faces 4, in particular the light decoupling face 4b, by two vertical wall portions 6' and 6" and also a horizontal wall portion 7. The vertical wall portions 6' and 6" of the light decoupling face 4a are offset here in a stepped manner by the length a rearwards, that is to say against the primary irradiation direction, with respect to the horizontal wall portion 7 arranged below. Alternatively, a variant is also possible in which the wall portions 6" and 6" are offset to a varying magnitude or in which the offset varies along the extension of the wall portions 6' and 6". The light decoupling face 4a and also all light decoupling faces 4 of the uppermost row as can be seen in FIG. 1, are offset by the same length a in a stepped manner with respect to the horizontal wall portion 7 arranged below, whereby the light exit faces 4 arranged in a row with the light exit face 4a are offset equally with respect to the focal plane E (see FIG. 3) and subsequently horizontally homogenise exiling light beams equally. A horizontal "growing together" of the light exposure is thus provided. It should be mentioned at this juncture that alternatively a vertical scattering can be achieved by offset of the horizontal wall portions 7. Both the vertical wall portions 6', 6" and also the horizontal wall portion 7 could also be offset, whereby a scattering is caused both in the vertical and horizontal direction.

FIG. 3 shows, in a perspective vertical sectional illustration of the first embodiment of the light guide unit 2 corresponding light sources 1 which are arranged behind the light guide unit 2 and thus opposite the projection lens (not illustrated). The light beams emitted by the light sources 1 are guided by the light guides 3 and exit from the light guide unit 2 through the light decoupling faces 4 in order to be projected by the projection lens for example into an area in front of the vehicle. Light sources that are preferred in the scope of the invention in particular are light-emitting diodes (LEDs) which are characterised by a high light output with very low overall size. For the specified application, conventional LEDs have edge lengths in the region of a millimeter and less and are arranged directly adjacently in a matrix, that is to say in groups, possibly on a common circuit board, wherein the outer form of this matrix or of these groups corresponds preferably approximately to the light exposure that is to be projected. Once the light guides 3 are arranged likewise directly above one another (also generally adjacently) in the light guide unit 2, the walls 9 between the individual light guides are inevitably very thin in order to produce a homogenous light exposure with a given size of the individual light sources 1. In this case the light decoupling faces 4 are formed in detail by irradiation-side end regions 5a, 5b, 5c etc. which are formed by the irradiation-side end of the wall 9 (for example of the wall portions 6', 6" and 7'; see FIG. 2) delimiting the light guide 3.

FIG. 4 shows an example of a light exposure that can be obtained by any embodiment of the light guide unit 2 according to the invention. In this case fields arranged in a matrix-like manner around a horizontal axis H and a vertical axis V can be seen, wherein those areas within the fields correspond to a light illumination and those areas between the fields accordingly constitute darker areas in the light exposure. The fields are arranged in three rows, wherein the fields of the upper two rows are illustrated distanced from one another in the horizontal direction by a darker area with the extension a'. The effect obtained by the lighting unit according to the invention can be clearly seen in the lower row. Fields arranged adjacently contact one another or overlap one another along an extension a", which means that undesirable inhomogeneities are avoided in these areas.

FIG. 5 illustrates a perspective illustration of a second embodiment of a light guide unit 2 according to the invention. In contrast to the first embodiment, the light guides 3 in this case are not formed as reflectors, but as optical waveguides, which, as described in the introduction, can be formed from plastic, glass or any other material suitable for guiding light. The optical waveguides in this case are formed as solid bodies, which means that the optical waveguide consists of a single, consistent optical medium and the light is guided within this medium. Similarly to the first embodiment, the light guides are formed in three rows arranged above one another. The light guides 3 or the optical waveguides run on the irradiation side to a common front end plate 14, which is delimited on the irradiation side by the light decoupling plane 10 (see FIGS. 7 and 8).

FIG. 6 shows a vertical section of the second embodiment according to FIG. 5. The irradiation-side surface of the front end plate 14 is curved (in accordance with a field of view curvature), wherein the focal plane E comes to lie within the front end plate 14. In this case a light guide unit 2 with light guides 3 formed from optical waveguides is show, said light guides converging on the irradiation side at a common front end plate 14 and opening out on the front side into a first light decoupling plane 10. The light decoupling plane 10 is composed here of the individual light decoupling faces 4 associated with the optical waveguides within the respective row and each arranged directly adjacently (see FIGS. 7 and 8, but substantially similar to FIG. 1 in terms of extent). A homogenisation is achieved in accordance with the invention in that in each case at least two light guides 3 adjacent to one another contact one another in a contact area 12 along an extension b and b' (see FIGS. 7 and 8), wherein the respective extensions band b', measured with respect to the focal plane E, deviate from one another. It can thus be inferred from FIG. 6 that the optical waveguides are arranged in three rows, wherein the optical waveguides that are arranged adjacently in the upper row contact one another already before the front end plate 14, whereby the light is mixed earlier than in the rows arranged below. The light emitted from the light sources 1 (not illustrated in FIG. 6) enters the optical waveguide here via a light entry face 13.

FIG. 7 and FIG. 8 show sectional illustrations of the upper and middle row respectively of the optical waveguide according to FIG. 6. FIG. 7 thus illustrates a section through the middle row of the optical waveguides, wherein the optical waveguides contact one another along the extension b, measured with respect to the focal plane E. FIG. 7 also shows exemplary beam paths exiting from the light entry faces 13, wherein two exemplary beams enclose a first angle α prior to the exit thereof from the front face. FIG. 8 illustrates a section through the upper row of optical waveguides according to FIG. 6. Here it can be clearly seen that the contact region between the optical waveguides has a greater extension b' than that which can be seen in FIG. 7 (b). The light beams guided into the optical waveguides can therefore mix earlier, whereby the light beams passing through the front face or the light decoupling plane 10 are widened. The angle α' enclosed by the light beam shown by way of example in FIG. 8 is therefore greater than the angle α, wherein the light beams can overlap with one another along the extension a" (shown in FIG. 4) along the focal plane. A horizontal local homogenisation of the irradiation of the upper optical waveguide row is thus provided (whereby a more homogenous light exposure can also be created, as shown in FIG. 4).

FIG. 9 shows a third embodiment of a light guide unit 2 according to the invention. The light guides 3 or the optical waveguides again run on the irradiation side to a common front end plate 14, which is delimited on the irradiation side by the light decoupling planes 10 and 11. The irradiation-side surface of the front end plate 14 is curved (in accordance with a field of view curvature). Here, the front end plate 14 has a thickness z. In contrast to the second embodiment, there are two light decoupling planes, specifically a first and a second light decoupling plane 10 and 11, which are offset in relation to one another by the length c with respect to the focal plane. Here, the first light decoupling plane 10 lies in the focal plane E. Both light decoupling planes 10 and 11 are composed of the individual light decoupling faces 4 associated with the optical waveguides within the respective row and each arranged directly adjacently, wherein each light decoupling face 4 is associated with either the first or the second light decoupling plane 10 or 11. All the light decoupling faces 4 associated with the light decoupling plane 11 have the same spacing from the focal plane E. In an alternative embodiment an arbitrary plurality of light decoupling planes can also be provided depending on which areas in the light exposure are to be homogenous.

It should be noted at this juncture that in this application the expression "the objects A and B are offset in relation to one another (or from one another) by a predefined length (or distance) with respect to the focal plane E" is understood to mean that the normal distances of the objects A and B from the focal plane E deviate from one another by the predefined length (or the distance).

Mixed variants of the three specified embodiments are also possible. For example, the second embodiment can be combined with the third embodiment in a particularly simple manner, since in both variants optical waveguides are used. It may also be that extensions b associated with individual light decoupling faces 4 or the lengths a and c of adjacent light decoupling faces 4 deviate, or that these also vary locally within individual light decoupling faces 4.

Furthermore, a light-scattering optics can additionally be provided directly on the light decoupling faces 4 of any embodiment, said optics causing a horizontal scattering of the light beams (for example a cylinder optics that scatters exclusively in the horizontal direction) and thus additionally assists the light homogenisation. This can be implemented easily in particular with embodiments based on optical waveguides.

The invention claimed is:
1. A vehicle headlight having a lighting unit comprising:
a plurality of light sources;
a light guide unit having a plurality of light guides, wherein each of said light guides has a light coupling face disposed directly opposite a light decoupling face, wherein the light guide unit is one-piece, wherein each of said light guides is assigned a separate light source from the plurality of light sources, which comprise LEDs, to provide a homogeneous light distribution and areas of concentrated irradiation; and
a downstream projection lens having a focal plane,
wherein each of said light guides extends from the light coupling face to the light decoupling face substantially along an axis of the downstream projection lens,
wherein the light decoupling faces of at least two adjacent light guides of the plurality of light guides are offset in relation to one another with respect to the focal plane,
wherein the light decoupling faces are part of a first decoupling plane and at least one second light decoupling plane, wherein individual light decoupling faces are adjacent to one another, wherein the first decoupling plane and the second light decoupling plane are offset in relation to one another with respect to the focal plane,
wherein the light guides are arranged in at least two rows arranged one above the other, and
wherein the light decoupling faces of an uppermost row of the light guides are offset in relation to a primary irradiation direction by a fixed distance with respect to the focal plane.

2. The vehicle headlight of claim 1, wherein the light decoupling faces of the at least two light guides are arranged one above the other at least in portions and are offset in relation to one another with respect to the focal plane.

3. The vehicle headlight of claim 1, wherein all light decoupling faces in a row are offset in relation to the light decoupling faces of a row arranged below with respect to the focal plane.

4. The vehicle headlight of claim 1, wherein the light guides are arranged in exactly three rows arranged above one another.

5. The vehicle headlight of claim 1, wherein the first light decoupling plane and the at least one second light decoupling plane are offset in relation to one another with respect to the focal plane.

6. The vehicle headlight of claim 1, wherein a light-scattering optics is provided directly on the light decoupling faces.

7. The vehicle headlight of claim 6, wherein the light-scattering optics is an exclusively horizontally scattering optics.

8. The vehicle headlight of claim 1, wherein the adjacent light decoupling faces touch one another.

9. A vehicle headlight having a lighting unit comprising:
a plurality of light sources;
a light guide unit having a plurality of light guides, wherein each of said light guides has a light coupling face disposed directly opposite a light decoupling face, wherein the light guide unit is one-piece, wherein each of said light guides is assigned a separate light source from the plurality of light sources, which comprise LEDs, to provide a homogeneous light distribution and areas of concentrated irradiation; and
a downstream projection lens having a focal plane,
wherein each of said light guides extends from the light coupling face to the light decoupling face substantially along an axis of the downstream projection lens,
wherein at least two light guides of the plurality of light guides adjacent to one another in each case contact one another in a contact area along an extension, wherein the respective extensions, measured with respect to the focal plane of the lens, deviate from one another.

10. The vehicle headlight of claim 1, wherein the lighting unit comprises a plurality of interconnected walls that form a grid that defines the plurality of light guides.

11. The vehicle headlight of claim 10, wherein the plurality of light guides are each hollow with reflector faces.

12. The vehicle headlight of claim 10, wherein the light decoupling faces share at least one vertical wall portion and at least one horizontal wall portion with an adjacent light guide of the plurality of light guides.

* * * * *